June 15, 1926.
H. C. LORD
1,588,480
RESILIENT WHEEL
Filed Feb. 26, 1921
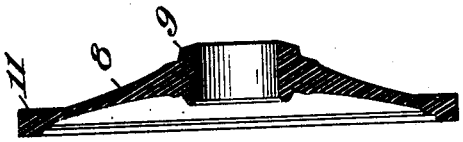
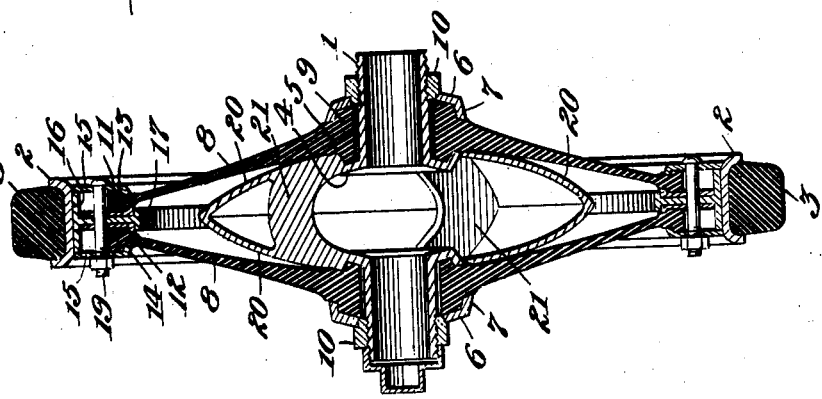
Inventor:
Hugh C. Lord Patented June 15, 1926.

1,588,480

UNITED STATES PATENT OFFICE.

HUGH C. LORD, OF ERIE, PENNSYLVANIA.

RESILIENT WHEEL.

Application filed February 26, 1921. Serial No. 448,136.

This invention is designed to provide a resilient connection between the rim and hub of the wheel so that the unsprung weight is confined to the rim portion. In accomplishing this I preferably use two rubber discs of less diameter than the rim and secure the central portions of these discs to the hub and stretch the discs to a securing position on the rim. The discs should have an angular relation to the axis so as to prevent side-sway. In carrying out my invention I provide means for limiting the side-sway and the radial displacement.

The invention is illustrated in the accompanying drawings as follows:—

Fig. 1 shows a side elevation of the wheel.

Fig. 2 shows a section on the line 2—2 in Fig. 1.

Fig. 3 shows a section of one of the discs before being extended in the wheel.

1 marks the hub, 2 the rim, and 3 a tire which, as shown, is a solid tire.

Flanges 4 extend from the hub and these are provided with the outwardly extending annular shoulders 5. Flanges 6 having the shoulders 7 oppose the flanges and shoulders 4 and 5. Rubber discs 8, one at each side of the wheel are each provided with the annular ribbed edge 9 which is placed within the shoulders 5 and 7. The flanges 6 are clamped against the ribbed edges by nuts 10.

The outer periphery of each disc has the annular ribbed edge 11, the inner shoulder of the ribbed edge being engaged by an annular shoulder 12 carried by a plate 13 and the outer shoulder of the ribbed edge being engaged by a shoulder 14 on an annular plate 15. A felly 16 has a shoulder 17 arranged within the shoulder 12 and on the outer periphery of the felly is disposed the rim 2 having flanges which are engaged by the outer edges of the plates 15. Bolts extend through the plates 15, 13 and felly 16 clamping the whole together.

In assembling the device the discs are engaged by an outside ring (not shown) and extended sufficiently to permit the placing of the plates 13 and 15. The plates may be temporarily secured by clamps and the edge is then released, dropping into place. The discs will assume a less inclined position than finally assumed and the plates then are drawn together to the final position on the felly 16 and clamped. There should be sufficient inclination of the discs to sustain normal side strains.

In order that all parts of the rubber may be equally strained, the area of all annular cross sections of the rubber which are subjected to the stretching action should be approximately the same. Thus the thickness at a point will be to the thickness of any other point inversely as the lengths of the radii to these points. In consequence the surfaces of the disc are relatively slightly concave. This will make the mass of rubber in zones of equal radial dimensions equal. It may be desirable with wheels which are subjected to driving strain to still further increase the thickness at the hub to ease the rearward distortion of the discs. This may be carried to a point where the areas near the hub are very largely relieved of stretch due to load strain, but, by reason of the greater leverage on the portion adjacent to the hub, may absorb the greater portion of distortion due to driving strain. Preferably, in any event, the rubber as it passes between the shoulders engaging the ribbed edges should be slightly thicker than the stretching portion of the disc and tapered in the stretching portion so that there will be no abrupt bending of the rubber with the displacement of the wheel.

The discs should be initially enough smaller than the rim to remain taut throughout with the maximum intended displacement.

In order to assure against excessive side-sway, the flanges 4 are extended at 20 quite close to the discs when the rim is depressed so that with an excessive side-sway the rubber will engage the flange and arrest the side-movement but without shock. The flanges 20 are connected at the outer periphery and radial webs 21 are arranged between the flanges. The flanges may extend sufficiently to limit the radial movement or displacement of the rim as desired.

What I claim is:

1. In a wheel, the combination of a hub; a rim; and a disc forming a connection extending from the hub and rim, said disc being of a cross section decreasing toward the outer periphery and from a point adjacent to the hub to a point adjacent to the rim, said disc being under initial tension.

2. In a wheel, the combination of a hub; a rim; and a disc forming a connection between the hub and rim, said disc being under initial tension and of a cross section decreasing toward the outer periphery equalizing the strains on equal masses on different portions of the disc.

3. In a wheel, the combination of a hub; a rim; and a disc forming a connection between the hub and rim, said disc being under initial tension and of decreasing thickness toward the outer periphery making the annular cross sections adjacent to the hub at least as great as portions adjacent the rim.

4. In a wheel, the combination of a hub; a rim; and a disc forming a connection between the hub and rim, said disc being under initial tension and of decreasing thickness toward the outer periphery making the annular cross sections from adjacent to the hub and adjacent to the rim approximately equal.

5. In a wheel, the combination of a hub; a rim; and two discs connecting the hub and rim, said discs being oppositely inclined to the axis of the wheel and under initial tension and decreasing in thickness toward the outer periphery from a point adjacent to the hub to a point adjacent to the rim.

6. In a wheel, the combination of a hub; a rim; and two discs connecting the hub and rim, said discs being oppositely inclined to the axis of the wheel and under initial tension and decreasing in thickness toward the outer periphery, the decrease in thickness equalizing the strain on different portions of the discs from adjacent to the hub to adjacent to the rim.

7. In a wheel, the combination of a hub; a rim; and two discs connecting the hub and rim, said discs being oppositely inclined to the axis of the wheel and under initial tension and decreasing in thickness toward the outer periphery, the decrease in thickness making the annular cross sections from adjacent to the hub to adjacent to the rim approximately equal.

8. In a wheel, the combination of a hub; a rim; and two rubber discs connecting the hub and rim, said discs being oppositely inclined to the axis of the wheel and under initial tension and decreasing in thickness toward the outer periphery, the decrease in thickness making the annular cross sections adjacent to the hub at least equal to cross sections adjacent the rim.

9. In a wheel, the combination of a hub; a rim; rubber discs connecting the hub and rim, said discs being opposingly inclined to the axis of the wheel and under initial tension; said rim being free to move axially against the tension of the discs to cushion the normal axially directioned shocks and means between the discs acting on the discs limiting the side movement of the rim.

10. In a wheel, the combination of a hub; a rim; rubber discs connecting the hub and rim, said discs being opposingly inclined to the axis of the wheel and under initial tension; said rim being free to move against the tension of the disc both radially and axially to sustain the normal shock, and means between the discs acting on the discs limiting the side movement of the rim and on the rim of the wheel to limit the radial movement of the rim.

In testimony whereof I have hereunto set my hand.

HUGH C. LORD.